(12) United States Patent
Monroe et al.

(10) Patent No.: US 12,154,005 B2
(45) Date of Patent: *Nov. 26, 2024

(54) OPTICAL CONTROL OF ATOMIC QUANTUM BITS FOR PHASE CONTROL OF OPERATION

(71) Applicant: University of Maryland, College Park, College Park, MD (US)

(72) Inventors: Christopher Monroe, Ellicott City, MD (US); Marko Cetina, College Park, MD (US); Norbert Linke, Stevenson, MD (US); Shantanu Debnath, College Park, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,954

(22) Filed: Apr. 24, 2023

(65) Prior Publication Data
US 2023/0267356 A1  Aug. 24, 2023

Related U.S. Application Data

(63) Continuation of application No. 17/313,450, filed on May 6, 2021, now Pat. No. 11,710,061, which is a
(Continued)

(51) Int. Cl.
*G06N 10/00* (2022.01)
*G06E 1/00* (2006.01)
*B82Y 10/00* (2011.01)

(52) U.S. Cl.
CPC .............. *G06N 10/00* (2019.01); *G06E 1/00* (2013.01); *B82Y 10/00* (2013.01)

(58) Field of Classification Search
CPC ........... G06N 10/00; G06E 1/00; B82Y 10/00
See application file for complete search history.

(56) References Cited

U.S. PATENT DOCUMENTS

| 8,385,548 B2 * | 2/2013 | Kanter ................... H04B 10/70 380/263 |
| 2003/0055513 A1 * | 3/2003 | Raussendorf .......... B82Y 10/00 700/1 |

(Continued)

FOREIGN PATENT DOCUMENTS

| CN | 101189627 A | 5/2008 |
| CN | 101868802 A | 10/2010 |

(Continued)

OTHER PUBLICATIONS

Office Action in CN201980007390.6, mailed Sep. 1, 2023, 5 pages.
(Continued)

*Primary Examiner* — Ajay Ojha
(74) *Attorney, Agent, or Firm* — ARENTFOX SCHIFF LLP

(57) ABSTRACT

The disclosure describes various aspects of optical control of atomic quantum bits (qubits) for phase control operations. More specifically, the disclosure describes methods for coherently controlling quantum phases on atomic qubits mediated by optical control fields, applying to quantum logic gates, and generalized interactions between qubits. Various attributes and settings of optical/qubit interactions (e.g., atomic energy structure, laser beam geometry, polarization, spectrum, phase, background magnetic field) are identified for imprinting and storing phase in qubits. The disclosure further describes how these control attributes are best matched in order to control and stabilize qubit interactions and allow extended phase-stable quantum gate sequences.

20 Claims, 9 Drawing Sheets

Related U.S. Application Data continuation of application No. 16/239,319, filed on Jan. 3, 2019, now Pat. No. 11,004,009.

(60) Provisional application No. 62/613,608, filed on Jan. 4, 2018.

(56) References Cited

U.S. PATENT DOCUMENTS

| | | |
|---|---|---|
| 2009/0296760 A1 | 12/2009 | Zhu |
| 2009/0302957 A1 | 12/2009 | Levi et al. |
| 2014/0264285 A1 | 9/2014 | Chow et al. |
| 2016/0064108 A1* | 3/2016 | Saffman ............ G21K 1/006 250/251 |
| 2017/0262765 A1 | 9/2017 | Bourassa |
| 2019/0303788 A1 | 10/2019 | Kelly et al. |
| 2020/0185120 A1 | 6/2020 | Keesling Contreras et al. |

FOREIGN PATENT DOCUMENTS

| | | |
|---|---|---|
| CN | 107070560 A | 8/2017 |
| WO | 2017111949 A1 | 6/2017 |

OTHER PUBLICATIONS

Nielsen, Michael A., et al., Quantum Computation and Quantum Information (Cambridge University Press, Address, 2000), 17 pages.

Ladd, T.D., et al., Quantum Computing, Nature 464, Sep. 12, 2010, 26 pages.

Trabesinger, Andreas, Nature Physics, Insight Issue: "Quantum Simulation," 8, 2012, Nature Publishing Group, 1 page.

Monroe, Christopher R., et al., Quantum Computing with Ions, Science American,. 299, 2008, 9 pages.

Blatt, Rainer, et al., Entangled states of trapped atomic ions, Nature vol. 453, Jun. 19, 2008, 8 pages.

Monroe, C., et al. Scaling the Ion Trap Quantum Processor, Science vol. 339, 1164, 2013, 7 pages.

Brown, Kenneth R., Co-designing a scalable quantum computer with trapped atomic ions, Nature Partner Journals, 2016, 10 pages.

Dehmelt, Hans G., Experiments with an Isolated Subatomic Particle at rest, Rev. Mod. Phys. 62, 1990, Nobel Lecture presented on Dec. 8, 1989, 13 pages.

Paul, Wolfgang, Electromagnetic traps for charged and neutral particles, Review of Modern Physics, vol. 62, 1990, 12 pages.

Wineland, D.J., et al., Laser Cooling of atoms, Physical Review, vol. 20, No. 4, Oct. 1979, 20 pages.

Leibfried, D., et al., Quantum dynamics of single trapped ions, Reviews of Modern Physics, vol. 75, Jan. 2003, 44 pages.

Olmschenk, S., et al., Manipulation and Detection of a Trapped Yb, Physical Review, vol. A 76, 052314, 2007, 9 pages.

Hume, D.B., et al., High-Fidelity Adaptive Qubit Measurements through Repetitive Information Transfer, Physical review letters 99, May 15, 2007, 4 pages.

Myerson, A., et al., High-fidelity readout of trapped-ion qubits, Physical Review Letters 100, Apr. 22, 2008, 4 pages.

Burrell, A.H., et al., Scalable simultaneous multi-qubit readout with 99.99% single-shot fidelity, Physical Review, Apr. 7, 2010, 4 pages.

Hayes, D., et al., Entanglement of Atomic Qubits Using an Optical Frequency Comb, Physical Review Letters, 104, Apr. 9, 2010, 4 pages.

Sorensen, Anders, et al., Multiparticle Entanglement of Hot Trapped Ions, Physical Review Letters, vol. 82, No. 9, Mar. 1, 1999, 4 pages.

Lee, P.J., et al., Phase Control of Trapped Ion Quantum Gates, Journal of Optics B: Quantum and Semiclassical Optics 7, Aug. 26, 2005, 13 pages.

Inlek, I.V., et al., Quantum Gates with Phase Stability Over Space and Time, Physical Review A 90, 042316, Oct. 14, 2014, 8 pages.

Islam, R., et al., Beat note Stabilization of Mode-Locked Lasers for Quantum Information Processing, Optics letters, vol. 39, No. 11, Jun. 1, 2014, 4 pages.

International Search Report and Written Opinion corresponding to International Application No. PCT/US2019/012296, dated Mar. 28, 2019.

Garcia-Ripoll, et al., "Fast and robust two-qubit gates for scalable ion trap quantum computing", arxiv.org, Cornell University Library, Jun. 1, 2003.

Saffman, et al., "Quantum information with Rydberg atoms", URL: <https://qudev.phys.ethz.ch/content/courses/QSIT07/qsit21_v1_2page.pdf>.

Lee P J et al., "Phase Control of Trapped Ion Quantum Gates", arxiv.org, Cornell University Library, 201 Olin Library Cornell University Ithaca, NY 14853, May 27, 2005.

Garcia-Ripoll J J et al., "Fast and robust two-quibit gates for scalable ion trap quantum computing", arxiv.org, Cornell University Library Cornell University Ithaca, NY 14853, Jun. 1, 2003.

M Saffman et al., "Quantum information with Rydberg atoms", Reviews of Modern Physics, Aug. 1, 2010, pp. 2313-2363.

Mohammadzadeh Naser Ed—Courtois Bernard: "Physical design of quantum circuits in ion trap technology—A survey", Microelectronics Journal, Mackintosh Publications Ltd. Luton, GB, vol. 55, Jul. 21, 2016, pp. 116-133.

Christian Schneider et al., "Many-Body Physics with Trapped Ions", arxiv.org, Cornell University Library, 201 Olin Library Cornell University Ithaca, NY 14853, Jun. 14, 2011.

Extended European Search Report issued Jul. 7, 2022 in European Patent Application No. 22157617.6, 13 pages.

* cited by examiner

OPTICAL CONTROL OF ATOMIC QUANTUM BITS FOR PHASE CONTROL OF OPERATION

CROSS REFERENCE TO RELATED APPLICATIONS

The present application is a continuation application of U.S. application Ser. No. 17/313,450, filed May 6, 2021, which is a continuation application of U.S. application Ser. No. 16/239,319, filed Jan. 3, 2019, now issued as Ser. No. 11,004,009, which claims priority to and the benefit of U.S. Provisional Patent Application No. 62/613,608, entitled "OPTICAL CONTROL OF ATOMIC QUANTUM BITS FOR PHASE CONTROL OF OPERATION," and filed on Jan. 4, 2018, the contents of each of which are incorporated herein by reference in their entirety.

GOVERNMENT LICENSE RIGHTS

This invention was made with government support under W911NF-16-1-0082 awarded by the Intelligence Advanced Research Projects Activity (IARPA). The government has certain rights in the invention.

BACKGROUND OF THE DISCLOSURE

Aspects of the present disclosure generally relate to quantum systems, and more specifically, to methods for coherently controlling quantum phases on atomic quantum bits (qubits) mediated by control fields, as applied to quantum logic gates, and in connection with generalized interactions between qubits.

Trapped atoms are one of the leading implementations for quantum information processing. Atomic-based qubits can be used as quantum memories, as quantum gates in quantum computers and simulators, and can act as nodes for quantum communication networks. Qubits based on trapped atomic ions enjoy a rare combination of attributes. For example, qubits based on trapped atomic ions have very good coherence properties, can be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations. Synchronization, stability, and control of qubit phases, however, is critical to the performance of extended quantum operations.

Accordingly, techniques that allow for phase control in atomic-based qubit operations are desirable.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

The disclosure describes techniques for controlling qubit operations within a crystal of trapped atomic ions using laser beams. Several degrees of freedom of the applied fields and atomic qubit structure are described that allow the control of phases of the various quantum operations applied to the trapped ion qubits.

In an aspect of the disclosure, a method for optical control of atomic quantum bits (qubits) is described that includes identifying a qubit operation, and controlling fields in optical beams applied to at least one of the atomic qubits for phase control of the qubit operation, wherein the optical beams are configured in a phase insensitive configuration, and wherein the optical beams include counter-propagating optical beams when the qubit operation is a multi-qubit operation.

In another aspect of the disclosure, a quantum information processing (QIP) system for optical control of atomic qubits is described that includes one or more optical sources, and an optical controller, wherein the optical controller is configured to identify a qubit operation; and control fields in optical beams applied to at least one of the atomic qubits for phase control of the qubit operation, wherein the optical beams are configured in a phase insensitive configuration, and wherein the optical beams include counter-propagating optical beams when the qubit operation is a multi-qubit operation.

In another aspect of the disclosure, a computer-readable medium storing code with instructions executable by a processor for optical control of atomic qubits includes code for identifying a qubit operation, and code for controlling fields in optical beams applied to at least one of the atomic qubits for phase control of the qubit operation, wherein the optical beams are configured in a phase insensitive configuration, and wherein the optical beams include counter-propagating optical beams when the qubit operation is a multi-qubit operation.

Described herein are methods, apparatuses, and computer-readable storage medium for various aspects associated with optical control of atomic quantum bits for phase control of operation.

BRIEF DESCRIPTION OF THE DRAWINGS

The appended drawings illustrate only some implementation and are therefore not to be considered limiting of scope.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

As described above, trapped atoms may be used to implement quantum information processing. Atomic-based qubits can be used as different type of devices, including but not limited to quantum memories, quantum gates in quantum computers and simulators, and nodes for quantum communication networks. Qubits based on trapped atomic ions can have very good coherence properties, can be prepared and measured with nearly 100% efficiency, and can be readily entangled with each other by modulating their Coulomb interaction with suitable external control fields such as optical or microwave fields. As used in this disclosure, the terms "atomic ions," "atoms," and "ions" may be used interchangeably to describe the particles that are to be confined, or are actually confined, in a trap to form a crystal or similar arrangement or configuration. This disclosure describes techniques in the form of methods or processes and equipment or apparatuses for using laser beams to control qubit operations within a crystal of trapped atomic ions. These techniques can leverage several degrees of freedom of the applied fields and atomic qubit structure that allow for control of phases of the various quantum operations applied to the trapped ion qubits. Synchronization, stability, and control of qubit phases is critical to the performance of extended quantum operations such as those used in quantum computations or quantum simulations.

The typical ion trap geometry or structure used for quantum information and metrology purposes is the linear radio frequency (RF) Paul trap (also referred to as an RF trap, surface trap, or simply a Paul trap), where nearby electrodes hold static and dynamic electrical potentials that lead to an effective inhomogeneous harmonic confinement of the ions. The RF Paul trap is a type of trap that uses electric fields to trap or confine charged particles in a particular region, position, or location. When atomic ions are laser-cooled to very low temperatures in such a trap, the atomic ions form a stationary crystal of qubits (e.g., a structured arrangement of qubits), with Coulomb repulsion balancing the external confinement force. For sufficient trap anisotropy, the ions can form a linear crystal along the weak direction of confinement, and this is the arrangement typically employed for applications in quantum information and metrology.

Figure 1A:
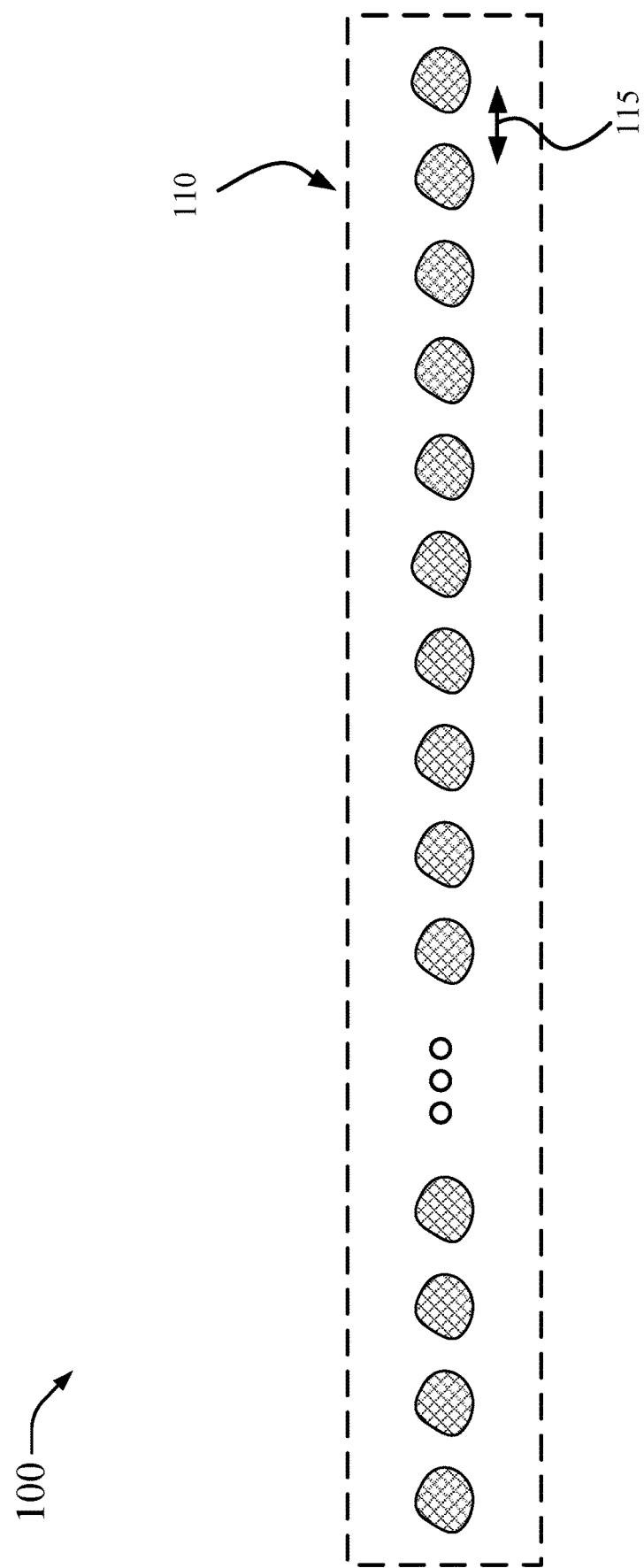
FIG. 1A illustrates a view of a vacuum chamber that houses electrodes for the trapping of atomic ions a linear crystal in accordance with aspects of the disclosure.

FIG. 1A illustrates a partial view of a vacuum chamber 100 that houses electrodes for the trapping of atomic ions in a linear crystal 110 using a linear RF Paul trap. In the example shown in FIG. 1A, a vacuum chamber in a quantum system includes electrodes for trapping 20 atomic Ytterbium ions (e.g., $^{171}Yb^+$ ions) which are confined in the linear crystal 110 and are laser-cooled to be nearly at rest. While 20 atomic ions are shown in this example, the number of atomic ions trapped can be configurable and more or fewer than 20 atomic ions may be trapped. The atoms are illuminated with laser radiation tuned to a resonance in $^{171}Yb^+$ and the fluorescence of the atomic ions is imaged onto a camera. In this example, atomic ions are separated by a distance 115 of about 5 microns (μm) from each other as shown by fluorescence. The separation of the atomic ions is determined by a balance between the external confinement force and Coulomb repulsion.

Figure 1B:
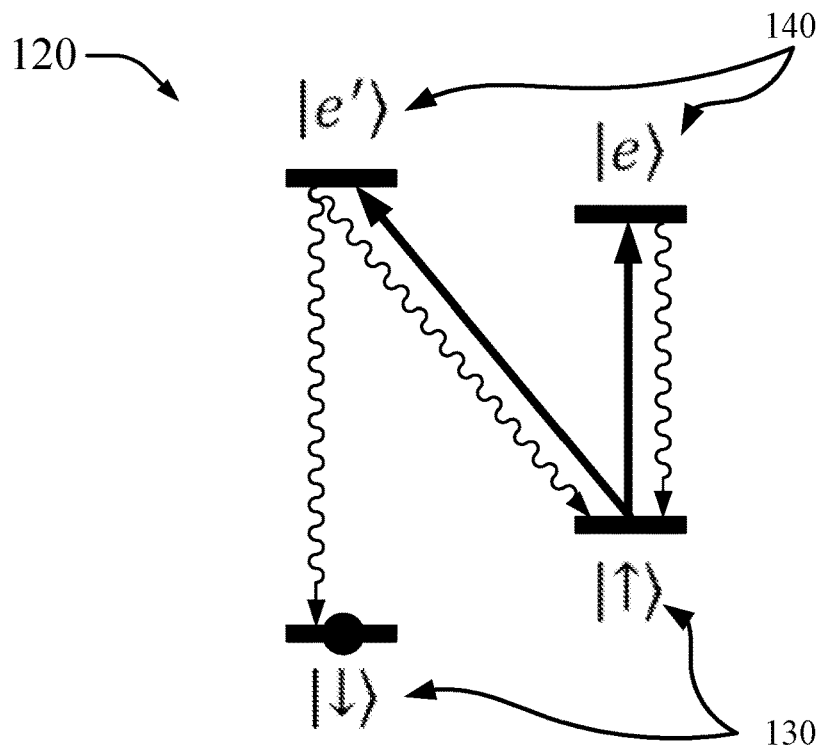
FIG. 1B is a diagram illustrating an example of a reduced energy level diagram showing the application of laser radiation for state initialization in accordance with aspects of the disclosure.
Figure 1C:
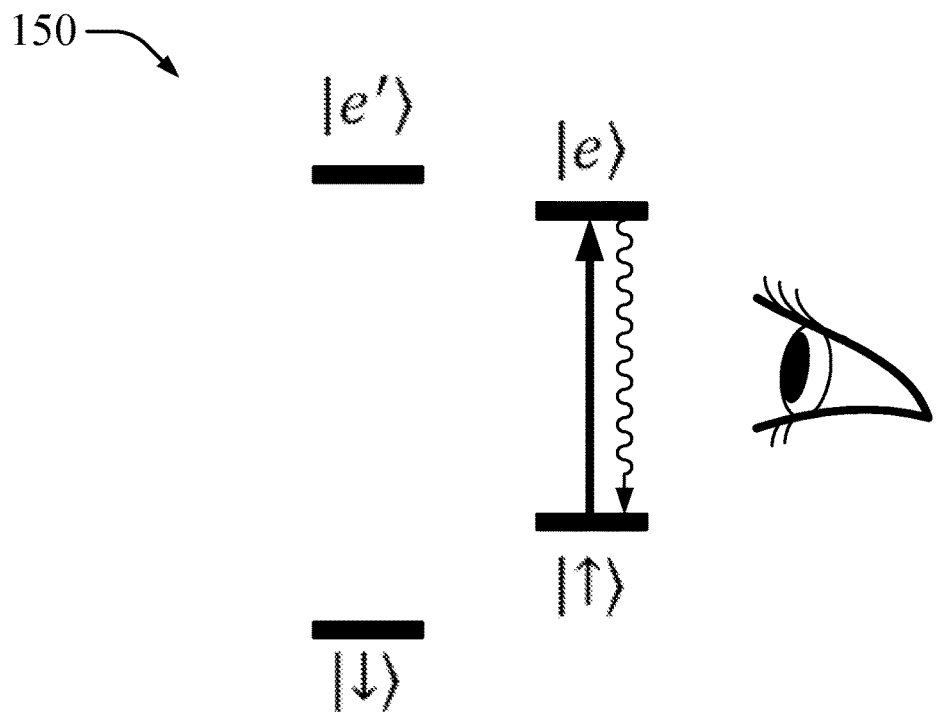
FIG. 1C is a diagram illustrating an example of a reduced energy level diagram showing the application of laser radiation for qubit state detection through fluorescence in accordance with aspects of the disclosure.

Strong fluorescence of individual trapped atomic ions relies on the efficient cycling of photons, thus the atomic structure of the ion must have a strong closed optical transition that allows for laser-cooling of the motion, qubit state initialization, and efficient qubit readout. This may rule out many atomic ion species, apart from simple atomic ions with a lone outer electron, such as the alkaline-earths ($Be^+$, $Mg^+$, $Ca^+$, $Sr^+$, $Ba^+$) and particular transition metals ($Zn^+$, $Hg^+$, $Cd^+$, and $Yb^+$). Within these atomic ions, quantum bits can be represented by two stable electronic levels, often characterized by an effective spin with the two states $|\uparrow\rangle$ and $|\downarrow\rangle$, or equivalently $|1\rangle$ and $|0\rangle$. FIG. 1B and FIG. 1C show the reduced energy level diagrams 120 and 150, respectively, for atomic ion $^{171}Yb^+$, where the qubit levels $|\uparrow\rangle$ and $|\downarrow\rangle$ 130 are represented by the stable hyperfine levels in the ground electronic state, and are separated by frequency $\omega_0/2\pi=12.642812$ GHz. The excited electronic states $|e\rangle$ and $|e'\rangle$ 140 in $^{171}Yb^+$ are themselves split by a smaller hyperfine coupling and are separated from the ground states by an optical interval having an energy corresponding to an optical wavelength of 369.53 nm.

Laser radiation tuned just below resonance in these optical transitions allows for Doppler laser cooling to confine the atomic ions near the bottom of the trap. Other more sophisticated forms of laser cooling can bring the atomic ions to be nearly at rest in the trap.

When a bichromatic laser beam (e.g., a beam with two tones produced by sidebands resulting from optical modulation) resonant with both $|\uparrow\rangle \leftrightarrow |e\rangle$ and $|\downarrow\rangle \leftrightarrow |e'\rangle$ transitions is applied to the atom, it rapidly falls into the state $|\downarrow\rangle$ and no longer interacts with the light field, allowing the initialization of the qubit with essentially 100% fidelity (see e.g., FIG. 1B).

When a single laser beam resonant with the $|\uparrow\rangle \leftrightarrow |e\rangle$ transition is applied, a closed cycling optical transition causes an ion in the $|\uparrow\rangle$ state to fluoresce strongly while an ion in the $|\downarrow\rangle$ state stays dark because the laser frequency is far from its resonance (see e.g., FIG. 1C). The collection of even a small fraction of this fluorescence allows for the detection of the atomic qubit state with near-perfect efficiency or accuracy. Other atomic species may have similar initialization/detection schemes.

In FIGS. 1B and 1C, all allowed transitions from the excited electronic states $|e\rangle$ and $|e'\rangle$ 140 are illustrated as downward, wavy arrows. On the other hand, the applied laser radiation (which is shown as upward, straight arrows) drive these transitions for initialization to state $|\downarrow\rangle$ as shown in FIG. 1B, and for fluorescence detection of the qubit state ($|\uparrow\rangle$ =fluorescence, $|\downarrow\rangle$ =no fluorescence) as shown in FIG. 1C.

For coherent transitions between qubit levels, there can be single qubit rotation operations and entangling multi-qubit operations. Single qubit rotation operations may also be referred to as single qubit operations or simply as qubit flipping.

With respect to single qubit rotation operations, qubit levels $|\uparrow\rangle$ and $|\downarrow\rangle$ 130 in FIGS. 1B and 1C can be directly coupled with external control fields, resulting in single qubit rotation operations. For a running wave (resonant) field described by $E(t)=E_0 e^{ik \cdot x - i\omega t - i\psi}$, where k is the wavevector, $\omega$ is the field frequency, and $\psi$ is the phase, on resonance ($\omega=\omega_0$) the result is a rotation operation on the qubit at position x (assuming the rotating wave approximation and that the phase $\psi$ is constant during the operation), as illustrated below in equations (1) and (2):

$$|0\rangle \rightarrow \cos(\theta/2)|0\rangle + e^{+i\phi}\sin(\theta/2)|1\rangle, \quad (1)$$

$$|1\rangle \rightarrow \cos(\theta/2)|1\rangle - e^{-i\phi}\sin(\theta/2)|0\rangle, \quad (2)$$

where $\theta=\Omega t$ and $\phi=k \cdot x - \psi$. Here $\Omega=\mu E_0/\hbar$ is the Rabi frequency that parametrizes the field-qubit coupling assuming an effective dipole transition with moment $\mu$. For two-field optical Raman fields A and B with coupling through an intermediate virtual level, the effective Rabi frequency is proportional to $\Omega_A \Omega_B$, the effective frequency of the field becomes the difference $\omega_A - \omega_B$, the wavevector k is given by the wavevector difference $\delta k = k_A - k_B$ between the two fields, and the phase becomes the phase difference $\delta\phi = \delta k \cdot x - (\psi_A - \psi_B)$. In practice, the two Raman fields must bridge the qubit frequency splitting coo. This can be accomplished with discrete modulation elements or the use of a mode-locked frequency comb laser. An optical frequency comb is a laser source having a spectrum with a series of discrete, equally spaced frequency lines. The combing effect can be generated by a number of mechanisms, including periodic modulation (e.g., in amplitude and/or phase) of a continuous-wave laser, four-wave mixing in nonlinear media, or by stabilization of the pulse train generated by a mode-locked laser (e.g., the mode-locked frequency comb laser described above).

For two successive rotations on the qubit separated by a time T, the accumulated qubit phase is $\psi+\omega T$. If the control field is a single-field coupling in the optical domain, this may require control of the optical frequency and phase over extended operations (e.g., longer or more involved operations). However, for two-field optical Raman couplings between qubits, the accumulated qubit phase is $\omega_A - \omega_B + (\omega_A - \omega_B)T$, requiring control of the frequency difference $\omega_A - \omega_B$ and the phase difference $\psi_A - \psi_B$. When the fields originate from the same laser and follow similar paths, the frequency and phase differences are typically created with an optical modulator driven by RF or microwave fields, which are much easier to control than absolute optical phases. Moreover, by using co-propagating Raman beams (e.g., Raman beams propagating in a same direction), the effective phase over a dx=1 µm displacement is only $|\delta k| dx \sim \omega_0 \, dx/c = 2\pi(4.2 \times 10^{-5})$ radians for the $^{171}$Yb$^+$ system. Given this level of phase noise rejection, two-field couplings are generally used in the techniques described below.

Figure 2A:
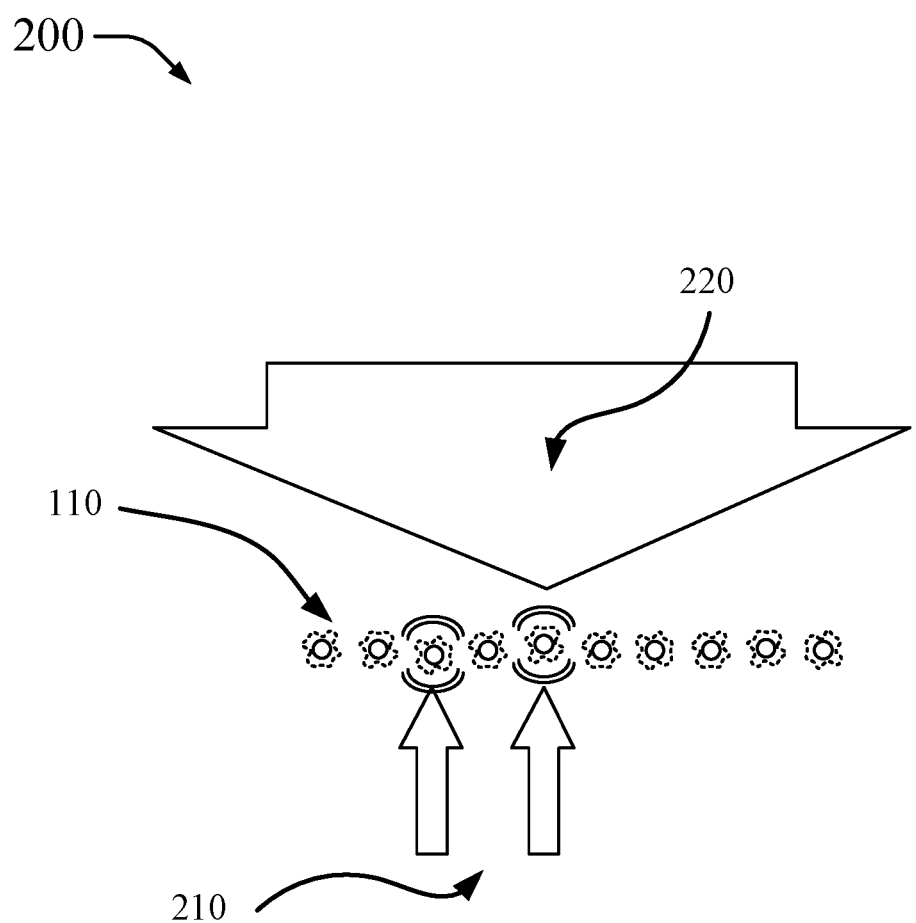
FIG. 2A is a diagram illustrating an example of Raman beam geometry in accordance with aspects of the disclosure.

With respect to entangling multi-qubit operations, the motion of many trapped ions is coupled through the Coulomb interaction, much like an array of pendulums that are connected by springs. A natural way to implement entangling quantum logic gates between atomic ions in a crystal is to use the motion as an intermediary, as illustrated in FIG. 2A, which shows a diagram 200 illustrating an example of Raman beam geometry and where the application of the beams produces motion in the qubits. In the diagram 200, there are optical beams 210 and 220 directed to the linear lattice or crystal 110 having the atomic ion qubits. The optical beams in the same direction may be referred to as co-propagating optical beams and the optical beams in opposite directions may be referred to as non-co-propagating or counter-propagating optical beams. The beams 210 (co-propagating) are focused or individually addressed beams, while the beam 220 (which counter-propagates with respect to the beams 210) is an unfocused, global beam. As used herein, the terms optical beams, beams, optical fields, and fields may be used interchangeably.

Using motion as an intermediary can be accomplished by applying qubit state-dependent optical or microwave dipole forces to the atomic ion(s). There are many protocols for the creation of controlled-NOT gates and other related multi-qubit entangling operations using this externally-applied qubit state-dependent force. By way of illustration, the popular Mølmer-Sørensen gate operation (also called MS, Ising, or XX gate operation) operation between two trapped ion qubits, although the phase dependence is similar in many similar classes of gates.

Figure 3A:
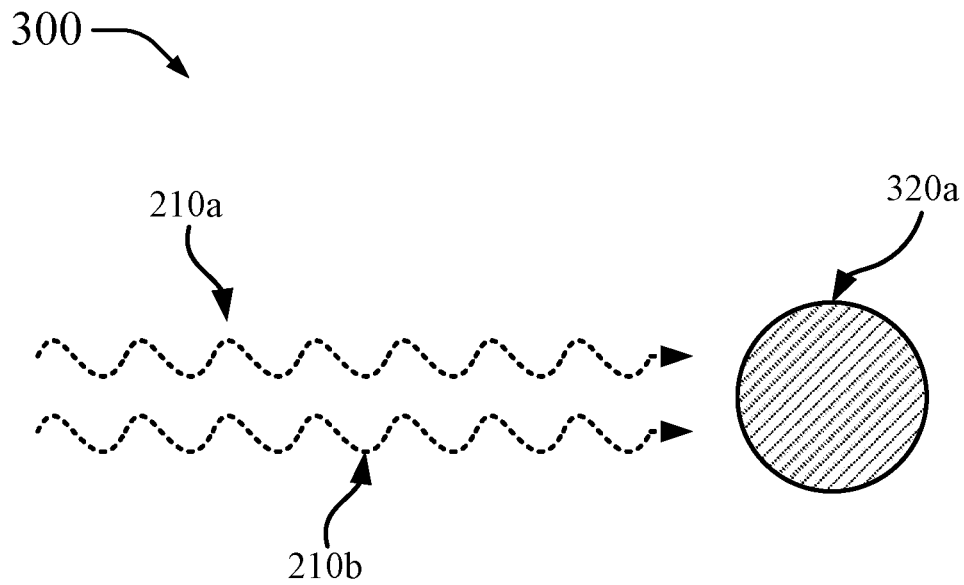
FIGS. 3A and 3B are diagrams that illustrates examples of co-propagating and counter-propagating optical beams in accordance with aspects of this disclosure.
Figure 3B:
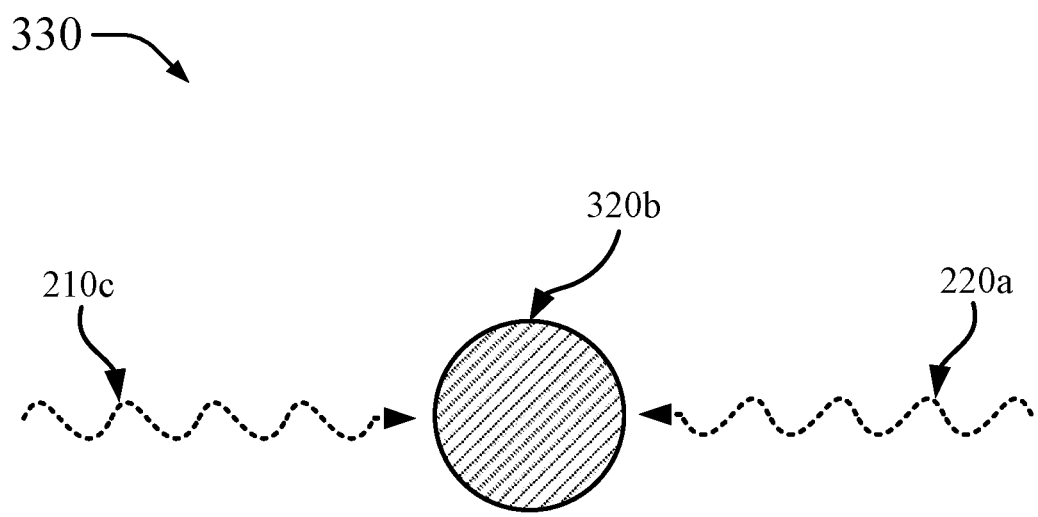

FIGS. 3A and 3B show diagrams 300 and 330, respectively, that illustrate examples of beam geometries having co-propagating and counter-propagating optical beams in accordance with aspects of this disclosure. In the diagram 300, co-propagating optical beams 210a and 210b (similar to co-propagating beams 210 in FIG. 2A) are both targeted at an atomic ion 320a (e.g., an atomic ion in the crystal 110) and propagate in the same or similar direction. In the diagram 330, a co-propagating optical beam 210c and a counter-propagating (or non-co-propagating) optical beam 220a (similar to counter-propagating beam 220 in FIG. 2A) are both targeted at an atomic ion 320b and propagate in opposite or substantially opposite directions.

Returning to FIG. 2A, the diagram 200 shows the Raman beam geometry for an example of a two qubit gate between select ions shown. Counter-propagating beams (pair of beams) 210 and beams 220 propagating in opposite directions) overlap on two trapped ions, and Raman transitions that couple to the collective modes of motion allow entangling operations. For single-qubit rotations, individual ions are addressed, and it may not be necessary for a counter-propagating geometry.

Coupling through a single mode of collection ion motion at frequency $\omega_m$ is considered. In general, the Mølmer-Sørensen gate operation requires two non-co-propagating or counter-propagating directions of laser beams (A and B) with wavevectors $k_A$ and $k_B$ that together drive both the upper and lower sideband transitions. The beam along direction A has a single frequency component $\omega_A$ with optical phase $\psi_A$ and the beam along direction B has two frequencies $\omega_B^\pm$ with optical phase $\psi_B$ so that the resulting two beatnotes between A and B are near the upper (+) and lower (−) sideband transitions. There are two spectral configurations to make these bichromatic beatnotes on beam B with respect the frequency of beam A, as illustrated below in equations (3) and (4):

$$\omega_B^\pm - \omega_A = +\omega_0 \pm (\omega_m + \delta) \text{ "Phase Sensitive,"} \quad (3)$$

$$\omega_B^\pm - \omega_A = \pm\omega_0 + (\omega_m + \delta) \text{ "Phase Insensitive,"} \quad (4)$$

That is, one possible configuration of the bichromatic beatnotes on beam B is phase sensitive (equation (3)) and the other possible configuration is phase insensitive (equation (4)).

As written, equations (3) and (4) assume that $\omega_B^+ > \omega_A$; for $\omega_B^+ < \omega_A$, an additional minus sign should be factored into the right hand side of equations (3) and (4).

An important aspect is that the phase insensitive configuration has upper and lower sideband beatnotes of opposite signs ($\omega_0 \gg \omega_m \pm \delta$), hence the optical phase accumulated from an interaction involving both beatnotes will cancel. The two-qubit evolution under the XX gate is shown below in equation (5):

$$|00\rangle \rightarrow |00\rangle - i|11\rangle e^{-i\chi}$$
$$|11\rangle \rightarrow |11\rangle - i|00\rangle$$
$$|01\rangle \rightarrow |01\rangle - i|10\rangle$$
$$|10\rangle \rightarrow |10\rangle - i|01\rangle e^{-i\chi}, \quad (5)$$

where the effective phase of the XX gate is $\chi=(\psi_A-\psi_B)$ for the phase sensitive case and $\chi=0$ for the phase insensitive case.

In view of the above description, and because synchronization, stability, and control of qubit phases is critical to the performance of extended quantum operations, the disclosure provides various techniques that can be used for phase control of trapped ion qubits. Accordingly, various techniques are described below for manipulating the optical fields (e.g., the laser beams) in such a way that allows phase control of the qubit operations for extended quantum operations, where drifts in the optical phases may lead to decoherence. The required polarization of Raman beams to drive transitions in the qubit depends on the atomic structure of the qubit levels and their couplings to the excited states. As an example, the disclosure considers the $^{171}Yb^+$ system shown in an energy level diagram 230 in which coherent stimulated Raman transitions couple the two qubit states labeled $|0\rangle$ and $|1\rangle$ and separated by frequency $\omega_q$, driven by laser fields at 355 nm with either $\sigma_+/\sigma_+$ or $\sigma_-/\sigma_-$ polarizations for the two Raman beams (e.g., any Raman process is driven with both beams polarized $\sigma_+$ or $\sigma_-$. It is to be understood, however, that systems other than the $^{171}Yb^+$ system, having possibly different levels and transition selection rules, may also be used in connection with the features described herein.

As described above, it is important to have control of the manner in which optical fields or beams (e.g., generated by a laser or other optical source) are oriented, including control of their geometry, polarization, and/or frequency, for example.

One aspect is that the frequency of the beams may be tuned in two different ways as described above. One approach is to be sensitive to the optical phase ("phase sensitive" configuration) and the other is not to be sensitive to the optical phase ("phase insensitive" configuration). Because optical phases vary over small distances, if there is any noise and the system is sensitive to the phase, that can cause issues during operation. Whatever the instantaneous value of the phase is, it is written, imparted, or imprinted to the quantum system and as more operations are added (e.g., extended quantum operations), then the phase can vary and introduce noise. There may be, however, techniques that can be used to cancel such noise.

Previous efforts had been focused on systems that are based on phase sensitive configurations. If these systems, however, merely implement short operations, it is possible to impart this phase and immediately resolve it (e.g. cancel it) by a very fast interferometer because it is possible to use the same laser (e.g., optical source) to do both. The instantaneous optical phase typically fluctuates over a long period of time but it does not vary during short experiments or simple operations. Most experiments or operations in the past have been short and phase sensitive configurations were easily implemented and handled as described above. For example, a short or quick experiment or operation, such as calibration, for example, could be based on a phase sensitive configuration because it could be easily controlled. As such, there was no need to implement phase insensitive configurations. Current efforts, on the other hand, may require extended quantum operations and there may be a need to implement phase insensitive configurations. That is, in long or extended quantum computations it may be undesirable for the phase to be written or imprinted into the system because it may drift over time and limit the accuracy of the entire system.

Figure 2B:
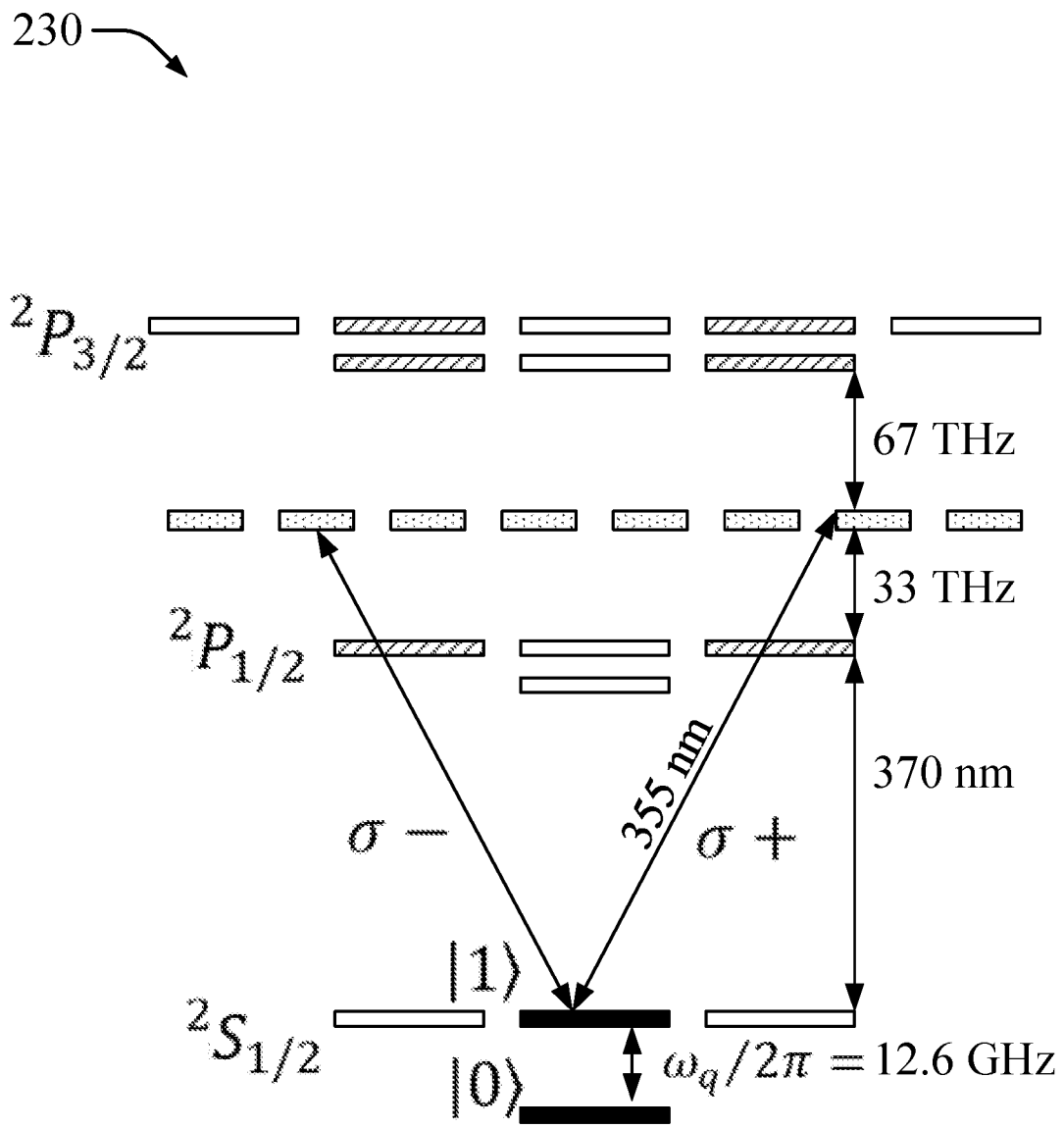
FIG. 2B is a diagram illustrating an energy level diagram showing coherent stimulated Raman transitions coupling the qubit states in accordance with aspects of the disclosure.

Another aspect described above and that is relevant in this disclosure is the geometry of the fields or beams as illustrated in FIGS. 2A, 2B, 3A, and 3B, for example. As shown in connection with these figures, a diagram 230 in FIG. 2B shows that qubit levels are separated in energy and there may be different approaches to enable transitions in the qubit levels. One approach is that to change the qubit level, the atomic state is changed by a large amount of energy and that change is driven by a direct optical transition. An issue with this approach is that is sensitive to the optical phase. The laser or optical radiation used to enable the transition ends up writing down the optical phase into the system.

A different approach, and one that may be used in connection with the various techniques described herein for optical control of atomic qubits for phase control in quantum operations, is to use microwave and not optical transitions. For example, in the examples of systems described above, there may be three (3) levels, and for a qubit at a bottom level it is possible to perform a two-photon (Raman) transition first up in energy and then down in energy (see e.g., FIG. 1B). The frequency difference between the two laser beams used for the transition is the relevant phase. Because of the difference in frequency, the phase is a microwave phase instead of an optical phase. Moreover, since both beams are typically derived from the same laser or optical source using a modulator, then the microwave phase is easy to control and it wavelength is large so there may be less of a concern regarding drifts.

Just like in classical logic there are single bit operations and multi-bit operations, using two optical beams as described above may be used to perform single qubit operations (e.g., rotation or qubit flipping) but multi-qubit operations (e.g., extended quantum computations). Single bit operations simply change qubit states and it is possible to do so with microwave beams as opposed to optical beams; however, because lasers are used to generate the beams that hit individual qubits and at least some of the beams need to be focused, it may be easier to use optical beams as they are easier to focus than microwave beams. Therefore, Raman or two-photon processes can be used with the two optical beams being co-propagating optical beams to perform a qubit rotation or flip (e.g., single qubit operation). If instead counter-propagating optical beams are used, it is possible not only to flip the qubit but also to impart a kick on the qubit (e.g., motion coupling).

For multi-qubit operations, to entangle the qubits (e.g., atomic ions), a force is needed (e.g., motion coupling) and counter-propagating optical beams may be used in this case since having emission and absorption in a same direction (e.g., co-propagating beams) would not produce the needed force for multi-qubit operations.

In view of the above, the present disclosure proposes the use of phase insensitive configurations to allow not only operations over the long haul (e.g., extended quantum computations), but also to enable single qubit operations that are motion insensitive (e.g., to avoid decoherence) by using co-propagating beams and multi-qubit operations by using counter-propagating beams. Accordingly, the present disclosure provides techniques that consider at least whether a phase sensitive or phase insensitive configuration is to be used, whether a single qubit or multi-qubit operation is to be performed, and whether operations are to couple motion (e.g., motion sensitive) or not couple motion (e.g., motion insensitive).

One feature related to phase control is that it may be sufficient to individually address (e.g., individually focus) trapped atomic ions from only one of the two non-co-propagating or counter-propagating Raman beams (see e.g., FIGS. 2A, 3B). That is, it may be sufficient to have one of the beams focus while the other is not focused. A natural geometry is to have a single global beam (e.g., beam 220) counter-propagating against N individual addressing beams for N trapped ion qubits (e.g., beams 210). In one example, if the global beam is turned off, it may be possible to still flip a qubit by arranging the individual beams to be phase insensitive. Individually addressing (or focusing) from both Raman beam directions is also possible, and may provide more flexibility on the frequency control of the beams. This option, however, may increase the complexity of the control operation.

Another feature related to phase control is that all Raman beam paths should be made as identical as possible (e.g., similar paths) in order to benefit from common-mode rejection of noise sources stemming from position instabilities of optical components (e.g., optical components in the optical control operations). That is, because two beams are being used, it is helpful to have the same paths to cancel out common sources of noise. Single-bit rotation operations are to be co-propagating, and correlation with beam pointing or position due to the requisite frequency shifts between beams is to be minimized.

Another feature related to phase control is that the phase insensitive configurations of the Raman transitions are to be used for phase stability. With co-propagating rotation operations, the phase insensitive geometry or configuration is needed for the system to not have a memory of optical phases between entanglement (e.g., multi-qubit) and rotation (e.g., single qubit) operations. That is, as described above, phase insensitive configurations are useful to perform long operations and to have both co-propagating beams for single qubit operations and counter-propagating beams for multi-qubit operations.

A further feature related to phase control is to the individual addressing of beams can be such that each beam is independently modulated using a variety of techniques, and for phase insensitive Raman XX gates, this may require the use of bichromatic RF drives on each individually-addressed beam. That is, individually addressing beams may have multiple tones. What differentiates a single qubit rotation from a single qubit rotation that also imparts a force (e.g., motion sensitive) is energy conservation. If the goal is to simply flip the qubit, then the beatnote between the beams needs to match the qubit energy. Otherwise, if the goal is to add or subtract motion, the frequency needs to be changed a bit. Because the laser that produces the beams is modulated, there are sidebands (e.g., bichromatic) produced that can be used to drive the forces. As described, this effect can be applied to individually addressing beams because it allows phase insensitive configuration, but may also be applied to global beams.

Yet another feature related to phase control is that an imbalanced $\sigma_+/\sigma_+$ versus $\sigma_-/\sigma_-$ path for Raman transitions is accompanied by relatively large AC Stark shifts, so the optimal polarization of any Raman process is to use a bichromatic laser where its two frequency components are linearly polarized with the polarization directions orthogonal to each other (e.g., lin ⊥ lin), and where both polarization directions are perpendicular to the quantization magnetic field. However, co-propagating rotation operations may not work with a single linear polarization along any direction owing to transition selection rules. So the rotation beams may need to have a component of helicity (e.g., imbalance of $\sigma_+$ versus $\sigma_-$), optimized to allow rotations while not imparting too large AC Stark shifts. That is, polarization may be used to cancel out AC Stark shifts that occur when instead of going up and down between two qubit levels as a result of a laser interaction, the laser interaction instead causes to go up and down to the same qubit level. The polarization used can be static or dynamic.

When the Raman beams are generated from a single optical frequency comb, the phase stability between comb teeth needs to be maintained using a direct locking technique feeding back directly to the laser. Feed-forward techniques are not preferred as these techniques may require more complex RF modulation in the beam paths.

Figure 4:
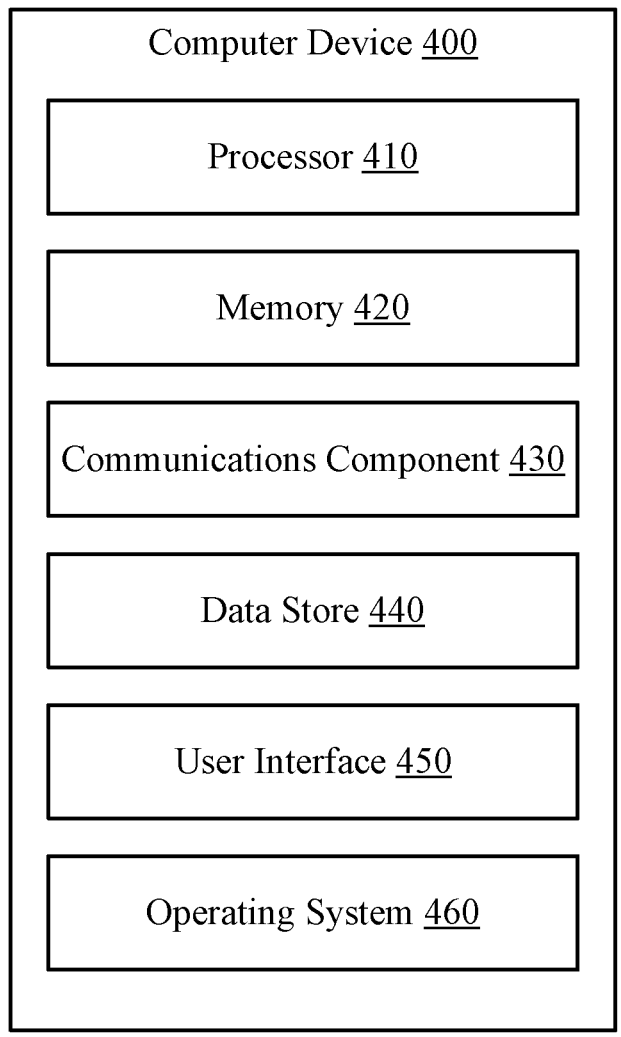
FIG. 4 is a diagram that illustrates an example of a computer device in accordance with aspects of this disclosure.

Referring now to FIG. 4, illustrated is an example computer device 400 in accordance with aspects of the disclosure. The computer device 400 can represent a single computing device, multiple computing devices, or a distributed computing system, for example. The computer device 400 may be configured as a quantum computer (e.g., a quantum information processing (QIP) system), a classical computer, or a combination of quantum and classical computing functions. For example, the computer device 400 may be used to process information using quantum algorithms based on trapped ion technology and may therefore implement methods for coherently controlling quantum phases on atomic quantum bits (qubits) mediated by control fields, as applied to quantum logic gates, and in connection with generalized interactions between qubits. A generic example of the computer device 400 as a QIP system that can implement the various phase controls described herein is illustrated in an example shown in FIGS. 6A and 6B.

In one example, the computer device 400 may include a processor 410 for carrying out processing functions associated with one or more of the features described herein. The processor 410 may include a single or multiple set of processors or multi-core processors. Moreover, the processor 410 may be implemented as an integrated processing system and/or a distributed processing system. The processor 410 may include a central processing unit (CPU), a quantum processing unit (QPU), a graphics processing unit (GPU), or combination of those types of processors. In one aspect, the processor 410 may refer to a general processor of the computer device 400, which may also include additional processors 410 to perform more specific functions such as functions for phase control.

In an example, the computer device 400 may include a memory 420 for storing instructions executable by the processor 410 for carrying out the functions described herein. In an implementation, for example, the memory 420 may correspond to a computer-readable storage medium that stores code or instructions to perform one or more of the functions or operations described herein. In one example, the memory 420 may include instructions to perform aspects of a method 500 described below in connection with FIG. 5. Just like the processor 410, the memory 420 may refer to a general memory of the computer device 400, which may also include additional memories 420 to store instructions and/or data for more specific functions such as instructions and/or data for phase control.

Further, the computer device 400 may include a communications component 430 that provides for establishing and maintaining communications with one or more parties utilizing hardware, software, and services as described herein. The communications component 430 may carry communications between components on the computer device 400, as well as between the computer device 400 and external devices, such as devices located across a communications network and/or devices serially or locally connected to computer device 400. For example, the communications component 430 may include one or more buses, and may further include transmit chain components and receive chain components associated with a transmitter and receiver, respectively, operable for interfacing with external devices.

Additionally, the computer device 400 may include a data store 440, which can be any suitable combination of hardware and/or software, that provides for mass storage of information, databases, and programs employed in connection with implementations described herein. For example, the data store 440 may be a data repository for operating system 460 (e.g., classical OS, or quantum OS). In one implementation, the data store 440 may include the memory 420.

The computer device 400 may also include a user interface component 450 operable to receive inputs from a user of the computer device 400 and further operable to generate outputs for presentation to the user or to provide to a different system (directly or indirectly). The user interface component 450 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 450 may include one or more output devices, including but not limited to a display, a speaker, a haptic feedback mechanism, a printer, any other mechanism capable of presenting an output to a user, or any combination thereof.

In an implementation, the user interface component 450 may transmit and/or receive messages corresponding to the operation of the operating system 460. In addition, the processor 410 may execute the operating system 460 and/or applications or programs, and the memory 420 or the data store 440 may store them.

When the computer device 400 is implemented as part of a cloud-based infrastructure solution, the user interface component 450 may be used to allow a user of the cloud-based infrastructure solution to remotely interact with the computer device 400.

Figure 5:
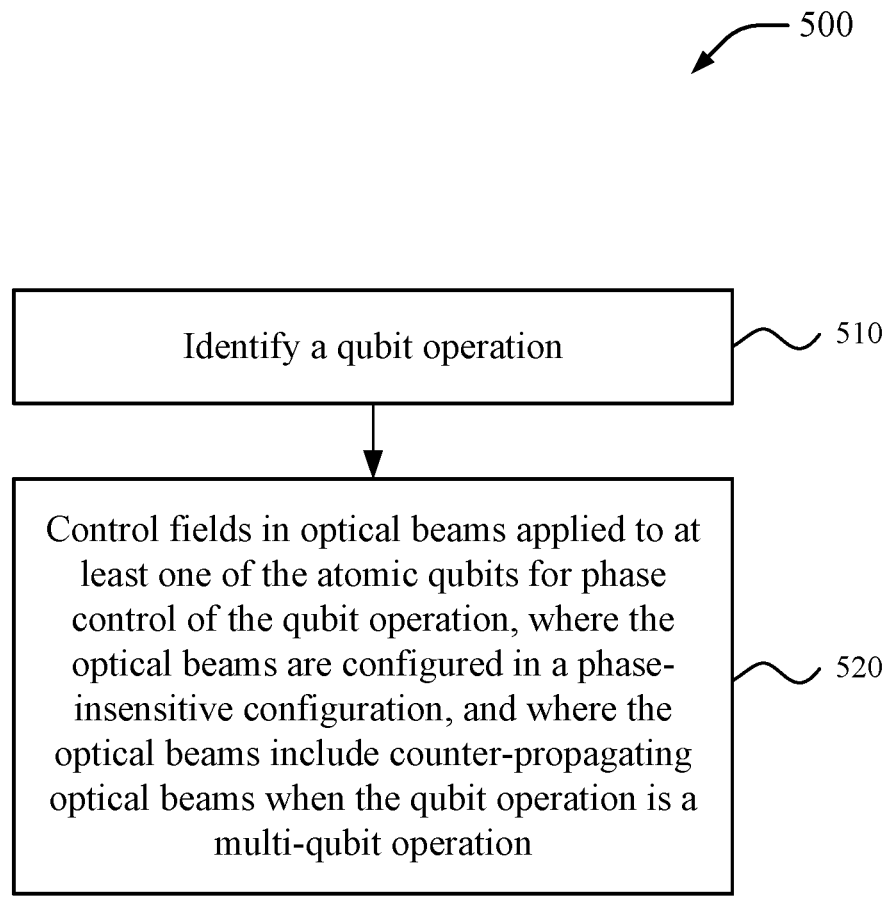
FIG. 5 is a flow diagram that illustrates an example of a method in accordance with aspects of this disclosure.

FIG. 5 is a flow diagram that illustrates an example of a method 500 for optical control of atomic qubits in accordance with aspects of this disclosure. In an aspect, the method 500 may be performed in a computer system such as the computer system 400 described above, where, for example, the processor 410, the memory 420, the data store 440, and/or the operating system 460 may be used to perform the functions of the method 500. Similarly, the functions of the method 500 may be performed by one or more components of a QIP system such as the QIP system 605 and its components (e.g., optical controller 620 and its subcomponents).

At 510, the method 500 includes identifying a qubit operation. For example, it may be determined whether a qubit operation for consideration is a single qubit operation or a multi-qubit operation.

At 520, the method 500 includes controlling fields in optical beams applied to at least one of the atomic qubits for phase control of the qubit operation, wherein the optical beams are configured in a phase insensitive configuration, and wherein the optical beams include counter-propagating optical beams when the qubit operation is a multi-qubit operation.

In an aspect of the method 500, optical beams include co-propagating optical beams when the qubit operation is a single qubit operation and is to be motion insensitive.

In an aspect of the method 500, the optical beams include counter-propagating optical beams when the qubit operation is a single qubit operation and is to be motion sensitive.

In an aspect of the method 500, the atomic qubits correspond to atomic ions in a crystal formed by an ion trap and the method 500 may further include configuring the optical beams to include two counter-propagating Raman beams, where controlling the fields in the optical beams applied to at least one of the atomic qubits includes individually addressing one of the atomic ions by focusing a first of the two counter-propagating Raman beams on the one atomic ion, and where a second of the two counter-propagating Raman beams is a global beam. In an aspect, the method 500 includes bichromatically driving the first of the two counter-propagating Raman beams that individually addresses the one atomic ion by frequency modulating the beam to produce sidebands. In an aspect, the method 500 includes configuring a first optical path for the first of the two counter-propagating Raman beams to be the same as a second optical path for the second of the two counter-propagating Raman beams.

In another aspect of the method 500, the atomic qubits correspond to atomic ions in a crystal formed by an ion trap and the method 500 may further include configuring the optical beams to include up to N individually addressing Raman beams for N atomic ions in the crystal with multiple optical frequencies on each of the individually addressing Raman beams, and a single global counter-propagating Raman beam against the up to N individually addressing Raman beams. In one implementation, the number of individually addressing Raman beans can be $N_1$ and the number of atomic ions can be $N_2$, where $N_1 < N_2$.

In another aspect of the method 500, the atomic qubits correspond to atomic ions in a crystal formed by an ion trap and the method 500 may further include configuring the optical beams include two counter-propagating Raman beams, where controlling the fields in the optical beams applied to at least one of the atomic qubits includes individually addressing one of the atomic ions by focusing a first of the two counter-propagating Raman beams on the one atomic ion and focusing a second of the two counter-propagating Raman beams on the one atomic ion.

In another aspect of the method 500, the qubit operation is one of multiple qubit operations in an extended quantum computation, and the phase insensitive configuration is used throughout the extended quantum computation.

In another aspect of the method 500, controlling the fields in the optical beams applied to at least one of the atomic qubits for phase control of the qubit operation includes controlling a polarization of the optical beams to compensate for an AC Stark shift of a qubit level in the at least one of the atomic qubits. The polarization of the optical beams to compensate for the AC Stark shift is configured to balance the AC Stark shift and enable different types of quantum gates associated with performing the quantum operations. Moreover, the polarization of the optical beams is a dynamic polarization, a static polarization, or a combination thereof.

In another aspect of the method 500, the method 500 further includes configuring the optical beams to be Raman beams, wherein the configuring includes generating the Raman beams from a single optical frequency comb and/or resulting from modulating an optical source, or from multiple phase-coherent sources phased locked, and wherein a phase stability between the multiple tones or teeth of the single optical frequency comb is maintained using a locking technique feeding back directly to the optical source.

In yet another aspect of the method 500, controlling the fields in the optical beams applied to the at least one of the atomic qubits for phase control of the qubit operation includes additionally controlling one or more of a geometry, a spectrum, or a polarization of the optical beams.

In another aspect of the method 500, the qubit operation is a rotation operation and the optical beams include co-propagating optical beams having a helicity configured to allow the rotation operation while also canceling out at least a portion of an AC Stark shift. In an example, the helicity includes an imbalance between $\sigma_+$ polarization versus $\sigma_-$ polarization.

Figure 6A:
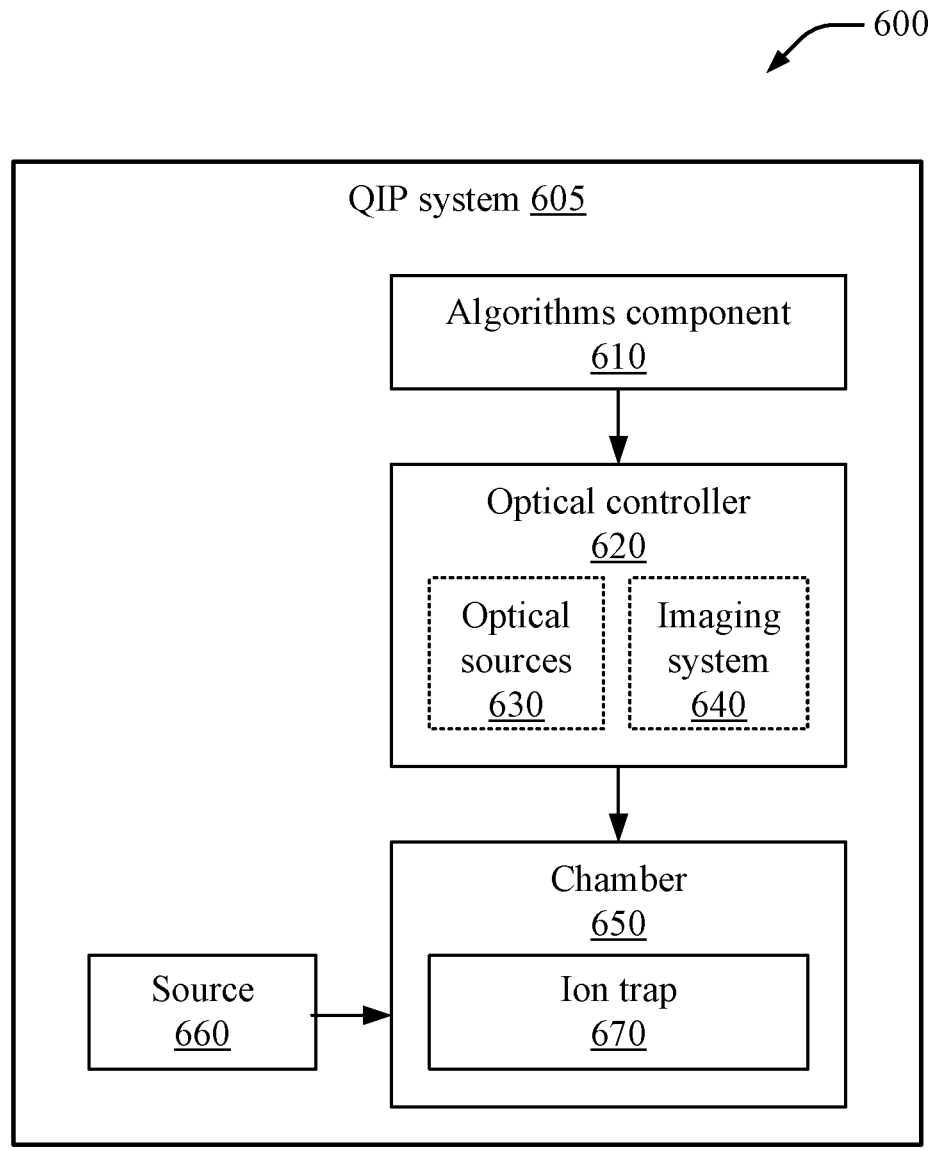
FIG. 6A is a block diagram that illustrates an example of a quantum information processing (QIP) system in accordance with aspects of this disclosure.

FIG. 6A is a block diagram 600 that illustrates an example of a QIP system 605 in accordance with aspects of this disclosure. The QIP system 605 may also be referred to as a quantum computing system, a computer device, or the like. In an aspect, the QIP system 605 may correspond to portions of a quantum computer implementation of the computing device 400 in FIG. 4.

Figure 6B:
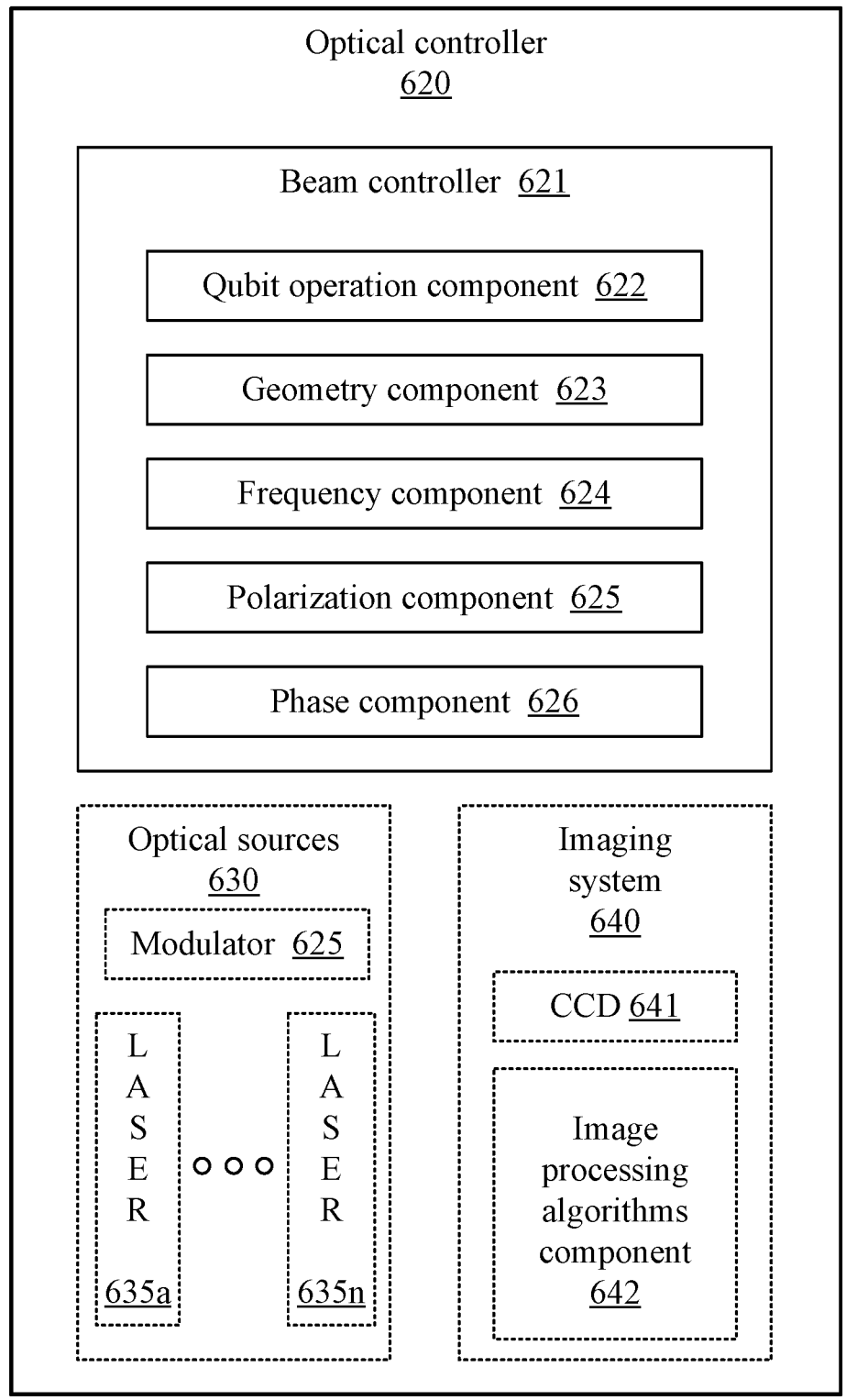
FIG. 6B is a block diagram that illustrates an example of an optical controller in accordance with aspects of this disclosure.

The QIP system 605 can include a source 660 that provides atomic species (e.g., a flux of neutral atoms) to a chamber 650 having an ion trap 670 that traps the atomic species once ionized (e.g., photoionized) by an optical controller 620 (see e.g., FIG. 6B). The chamber 650 may be an example of the vacuum chamber 100 in FIG. 1A. Optical sources 630 in the optical controller 620 may include one or more laser sources that can be used for ionization of the atomic species, control (e.g., phase control) of the atomic ions, for fluorescence of the atomic ions that can be monitored and tracked by image processing algorithms operating in an imaging system 640 in the optical controller 620, and/or to perform the optical control functions described in this disclosure. In an aspect, the optical sources 530 may be implemented separately from the optical controller 620.

The imaging system 640 can include a high resolution imager (e.g., CCD camera) for monitoring the atomic ions while they are being provided to the ion trap or after they have been provided to the ion trap 670. In an aspect, the imaging system 640 can be implemented separate from the optical controller 620, however, the use of fluorescence to detect, identify, and label atomic ions using image processing algorithms may need to be coordinated with the optical controller 620.

The QIP system 605 may also include an algorithms component 610 that may operate with other parts of the QIP system 605 (not shown) to perform quantum algorithms or quantum operations, including single qubit operations or multi-qubit operations as well as extended quantum computations. As such, the algorithms component 610 may provide instructions to various components of the QIP system 605 (e.g., to the optical controller 620) to enable the implementation of the quantum algorithms or quantum operations, and consequently, implement the various phase control techniques described herein.

FIG. 6B shows at least a portion of the optical controller 620. In this example, the optical controller 620 can include a beam controller 621, the optical sources 630, and the imaging system 640. As shown by the dotted lines, one or both of the optical sources 630 and the imaging system 640 may be implemented separate from, but in communication with, the optical controller 620. The imaging system 640 includes a CCD 641 (or similar imager or camera) and an image processing algorithms component 642. The optical sources 630 includes a modulator 625 and multiple laser sources 635a, . . . , 635b, which may be used for one or more of the functions described above (e.g., ionization, fluorescence, phase control).

The beam controller 621 is configured to perform various aspects described herein for coherently controlling quantum phases on atomic qubits mediated by control fields, as applied to quantum logic gates, and/or in connection with generalized interactions between qubits. For example, the beam controller 621 may include a qubit operation component 622 configured to identify or determine whether a single qubit operation and/or a multi-qubit operation is to be performed, and configure operations accordingly. The beam controller 621 may also include a geometry component 623 configured to determine and enable different geometry configurations as described herein. The beam controller 621 may also include a frequency component 624 configured to determine and enable different frequencies as described herein. The beam controller 621 may also include a polarization component 625 configured to determine and enable different polarizations as described herein. The beam controller 621 may also include a phase component 626 configured to determine and enable different phase operations as described herein. The various components of the beam controller 621 may operate individually or in combination to perform the various functions described in this disclosure, for example, the method 500 in FIG. 5. Moreover, the beam controller 621 (and one or more of its subcomponents) may be configured to enable phase insensitive configurations to perform long operations and to have both co-propagating beams for single qubit operations and counter-propagating beams for multi-qubit operations.

Although the present disclosure has been provided in accordance with the implementations shown, one of ordinary skill in the art will readily recognize that there could be variations to the embodiments and those variations would be within the scope of the present disclosure. Accordingly, many modifications may be made by one of ordinary skill in the art without departing from the scope of the appended claims.

What is claimed is:

1. A method for optical control of qubits within an ion trap, the method comprising:
   identifying a qubit operation from a plurality of qubit operations in a quantum computation;
   determining whether the qubit operation is a single qubit operation or a multi-qubit operation; and
   applying co-propagating optical beams to at least one qubit in the ion trap to control the qubit operation when the qubit operation is determined to be a single qubit operation.

2. The method of claim 1, further comprising applying counter-propagating optical beams to at least one qubit in the ion trap to control the qubit operation when the qubit operation is determined to be a multi-qubit operation.

3. The method of claim 1, further comprising applying the co-propagating optical beams to the at least one qubit in the ion trap for phase control of the qubit operation.

4. The method of claim 1, further comprising applying the co-propagating optical beams to the at least one qubit in the ion trap for microwave control of the qubit operation.

5. The method of claim 1, further comprising determining whether to apply the co-propagating optical beams or the counter-propagating optical beams based on whether the qubit operation is to be motion sensitive or motion insensitive.

6. The method of claim 1, further comprising applying the co-propagating optical beams in response to the qubit operation being identified as a single qubit operation and the qubit operation being motion insensitive.

7. The method of claim 2, further comprising:
configuring the co-propagating optical beams in a phase insensitive configuration; and
applying the co-propagating optical beams by applying up to N individually addressing Raman beams for N atomic ions in a crystal with multiple optical frequencies on each of the individually addressing Raman beams, and a single global counter-propagating Raman beam against the up to N individually addressing Raman beams.

8. The method of claim 2, further comprising controlling a polarization of the co-propagating optical beams to compensate for an AC Stark shift of a qubit level in the at least one qubits.

9. The method of claim 8, wherein the polarization of the co-propagating optical beams is a dynamic polarization, a static polarization, or a combination thereof.

10. The method of claim 2, wherein applying either of the co-propagating optical beams or the counter-propagating optical beams includes controlling one or more of a geometry, a spectrum, or a polarization of the optical beams.

11. A quantum information processing (QIP) system for optical control of qubits within an ion trap, the system comprising:
one or more optical sources that generate co-propagating optical beams and counter-propagating optical beams; and
an optical controller configured to:
identify a qubit operation from a plurality of qubit operations in a quantum computation;
determine whether the qubit operation is a single qubit operation or a multi-qubit operation; and
apply the co-propagating optical beams to at least one qubit in the ion trap to control the qubit operation when the qubit operation is determined to be a single qubit operation.

12. The QIP system of claim 11, wherein the optical controller is further configured to apply the counter-propagating optical beams to at least one qubit in the ion trap to control the qubit operation when the qubit operation is determined to be a multi-qubit operation.

13. The QIP system of claim 11, wherein the optical controller is further configured to apply the co-propagating optical beams to the at least one qubit in the ion trap for phase control of the qubit operation.

14. The QIP system of claim 11, wherein the optical controller is further configured to apply the counter-propagating optical beams to the at least one qubit in the ion trap for microwave control of the qubit operation.

15. The QIP system of claim 11, wherein the optical controller is further configured to determine whether to apply the co-propagating optical beams or the counter-propagating optical beams based on whether the qubit operation is to be motion sensitive or motion insensitive.

16. The QIP system of claim 11, wherein the optical controller is further configured to apply the co-propagating optical beams in response to the qubit operation being identified as a single qubit operation and the qubit operation being motion insensitive.

17. The QIP system of claim 12, wherein the optical controller is further configured to:
configure the co-propagating optical beams in a phase insensitive configuration; and
apply the co-propagating optical beams by applying up to N individually addressing Raman beams for N atomic ions in a crystal with multiple optical frequencies on each of the individually addressing Raman beams, and a single global counter-propagating Raman beam against the up to N individually addressing Raman beams.

18. The QIP system of claim 12, wherein the optical controller is further configured to control a polarization of the co-propagating optical beams to compensate for an AC Stark shift of a qubit level in the at least one qubits.

19. The QIP system of claim 18, wherein the polarization of the co-propagating optical beams is a dynamic polarization, a static polarization, or a combination thereof.

20. The QIP system of claim 12, wherein the optical controller is further configured to apply either of the co-propagating optical beams or the counter-propagating optical beams includes controlling one or more of a geometry, a spectrum, or a polarization of the optical beams.

* * * * *